US008078590B2

(12) United States Patent
Albert et al.

(10) Patent No.: US 8,078,590 B2
(45) Date of Patent: Dec. 13, 2011

(54) DATA PROCESSING SYSTEM

(75) Inventors: Beate Albert, Dielheim (DE); Juergen Kind, Ostringen (DE); Igor Pak, Mannheim (DE); Guenter Scherberger, Denzlingen (DE)

(73) Assignee: SAP AG, Walldorf (DE)

( * ) Notice: Subject to any disclaimer, the term of this patent is extended or adjusted under 35 U.S.C. 154(b) by 1468 days.

(21) Appl. No.: 11/052,207

(22) Filed: Feb. 8, 2005

(65) Prior Publication Data

US 2005/0198081 A1 Sep. 8, 2005

(30) Foreign Application Priority Data

Feb. 9, 2004 (EP) .................................... 04002805

(51) Int. Cl.
*G06F 7/00* (2006.01)
*G06F 17/30* (2006.01)
(52) U.S. Cl. ....................................................... 707/685
(58) Field of Classification Search ................ 707/1–10, 707/100–104.1, 200–206, 600–831
See application file for complete search history.

(56) References Cited

U.S. PATENT DOCUMENTS

| | | | |
|---|---|---|---|
| 5,414,836 A * | 5/1995 | Baer et al. ........................ | 714/38 |
| 5,513,315 A * | 4/1996 | Tierney et al. ................... | 714/37 |
| 5,642,478 A | 6/1997 | Chen et al. | |
| 5,870,607 A | 2/1999 | Netzer | |
| 6,314,530 B1 | 11/2001 | Mann | |
| 2003/0005415 A1 * | 1/2003 | Bates et al. .................... | 717/129 |
| 2003/0009696 A1 * | 1/2003 | Bunker et al. ................ | 713/201 |

FOREIGN PATENT DOCUMENTS

WO  WO 03/096191 A  11/2003

OTHER PUBLICATIONS

European Communication dated Jul. 8, 2004 (7 pages).
European Search Report, dated Jul. 8, 2004 (2 pages).
Communication from the Canadian Intellectual Property Office in Application No. 2,492,367, Jul. 28, 2010, 5 pages.

\* cited by examiner

*Primary Examiner* — Jean B Fleurantin
(74) *Attorney, Agent, or Firm* — Finnegan, Henderson, Farabow, Garrett & Dunner, LLP

(57) ABSTRACT

Embodiments consistent with the present invention relate to methods and computer systems for displaying customizing parameters of an application program, the customizing parameters being stored in database tables. In one embodiment, a method is provided that comprises: executing an application program, and acquiring trace data during execution of the application program, the trace data comprising a path for each of the results provided by the application program, each path being descriptive of a sequence of database table entries of the database tables holding a sub-set of the customizing parameters used for a calculation of the corresponding result. The method may further comprise displaying the results, interactively selecting one of the results for further analysis, and displaying the database table entries identified by the path of the selected one of the results.

12 Claims, 4 Drawing Sheets

DATA PROCESSING SYSTEM

BACKGROUND

1. Technical Field

The present invention generally relates to the field of data processing. More particularly, embodiments of the present invention relate to the acquisition and analysis of trace data.

2. Background Information

During the development of a computer program, it often is desirable to test the computer program by providing test data and then executing the computer program to generate test results. A user then may evaluate the test results and modify the computer program based upon the results. During this process, the user may desire to run at least a portion of the computer program several times to assist, for example, in isolating the suspected cause of an error. When, however, a computer program is very large or has a very long execution time, it may be impractical to replay the entire program for evaluation and debugging. Therefore, a technique called incremental replay was developed which allows a user to select and replay only a portion of the computer program's execution.

To provide effective support for debugging and testing computer programs, a replay apparatus must incur low setup and replay times, it must interfere with and slow down the program's execution as little as possible, and it must not require large amounts of data to be stored. Setup time is the time required to prepare for replay after an original program has been executed at least once. Replay time is the time required to actually re-execute the instructions associated with the desired portion of the computer program.

Some approaches minimize setup time while other approaches minimize replay time. During the setup time, variables or memory locations typically are set to values that are accurate for the portion of the computer program that is to be replayed. Typically, this practice includes providing, during or prior to replay, the same values to the memory locations that were present during the initial execution of the program.

Interference with the original (first executed) program often is caused by inserting instrumentation instructions into the original program to facilitate replay. If there are too many of such instrumentation instructions or if such instructions are too intrusive, then the original program may be slowed down too much during the initial execution or during the replay.

Because replay generally involves some storage during an initial execution of a program, as mentioned above, another consideration is the amount of data to be stored. Although enough data should be stored to accurately replay the desired portions of the original program execution, too much stored data will require excess storage resources as well as unnecessary overhead functions to manage the stored data.

One approach to incremental replay uses a virtual memory system of a computer to periodically trace, at fixed time intervals, the pages of the virtual memory system that were modified by a computer program since a previous checkpoint of the computer program. The term "trace," as used herein, refers to storing data in a memory so that such data is available for later use, such as resetting variables and memory locations.

To restart the program's execution from an intermediate point requires that a replay tool search the stored trace to find the most recent trace of each page. Because checkpoints are taken at fixed time intervals, the system bounds replay time, i.e., the amount of time required to replay up to a desired portion of the original program execution. However, setting up the state for the replay may require searching through an entire trace file, which may involve significant time and resources. Although this approach is adaptive in that it traces only pages that have been recently written to, tracing the entire contents of pages that have been written to since the last checkpoint can require large amounts of storage.

Another approach to tracing is performed at compile-time of a program to determine what and when to trace. In particular, a pre-log on the entry of each procedure is written, with the pre-log containing the values of the variables that the procedure might possibly read. The pre-log allows a procedure to be replayed alone since the pre-log contains all variables necessary for the instructions of the procedure to properly execute. A post-log is written upon exit from the procedure, with the post-log containing the values of the variables that the procedure might have modified. The post-log allows the procedure to be skipped during replay since the post-log includes changes that the procedure might make.

Such a system may result in storing much more data than is actually required to facilitate replay, because the analysis performed at compile-time must be conservative to assure that any replay will be accurate. Additionally, tracing only at procedure entry and exit may incur a large amount of intrusion during the initial execution of the program, and does not guarantee that replay up to a desired portion of the execution will be attainable in a predetermined amount of time. For example, a loop that is iterated several times and includes a procedure call may result in many needless traces. Conversely, a very long procedure call may not be traced often enough to replay any part of the procedure within time constraints that are acceptable to a user.

Another system traces a "change set" before each statement or group of statements. The change set includes the values of the variables which might be modified by the statement or group of statements. A debugger then can backup execution over a statement by restoring the state from the associated change set. To bound the trace size, it is possible to store only the most recent change set for each statement. The system statically computes the change sets, and for programs that use pointers and arrays, the system must trace each such access. The system does not bound the time required to perform a replay, since it requires backing up to an instruction that is prior to the desired interval, and then progressing forward to perform the desired interval. This system is limited by its static nature, in that it may have to trace every array or pointer reference for example.

Another technique maintains a hierarchy of checkpoints, each checkpoint taken at successively larger time granularities, so that recent states can be reproduced relatively quickly while older states incur more delay. This technique also includes a virtual snapshot as an approach to check-pointing, in which only the elements of a checkpoint that differ from a previous checkpoint are saved.

U.S. Pat. No. 5,870,607 shows a method for selective replay of computer programs. A user can selectively reply portions of a computer program execution so that the entire program need not be run again to support further test and debug. A run-time instrumented version of the program is created by inserting special instructions into the original program. The run-time instrumented version is executed to create trace files of memory accesses and system calls as well as identification of interrupts.

U.S. Pat. No. 5,642,478 shows a distributed trace data acquisition system. An event data capture circuit is integrated into each processing node in a distributed multi-node system for capturing even data within each node under software control.

U.S. Pat. No. 6,314,530 shows a computer system having an on-chip trace memory having a plurality of locations for storing trace information that indicates execution flow in the processor.

Despite such advancements, conventional tracing techniques suffer from one or more disadvantages. For example, a common disadvantage of known tracing techniques is that the ability to review and modify customizing parameters is not supported.

The above description is based on the knowledge of the present inventors and not necessarily that known in the art.

SUMMARY

As further disclosed herein, embodiments consistent with the present invention encompass data processing systems having means for storing database tables holding customizing parameters for customizing an application program. Embodiments consistent with the present invention also relate to application programs, trace programs and analytical programs.

In accordance with one embodiment, the results provided by the execution of an application program are stored and displayed for a user's selection. During execution of the application program, trace data is acquired by the trace program. The trace data comprises a path indication for each of the results. Each path is descriptive of a sequence of database table entries of the database tables holding a sub-set of the customizing parameters used for calculation of the corresponding result.

When a user selects one of the displayed results for analysis of the underlying customizing parameters that have been used for calculation of the result by the application program, the path of database table entries being assigned to the result is retrieved from the trace data. This facilitates sequential display of the database table entries identified by the path for a user's review and/or modification.

In accordance with another embodiment of the invention, explanatory text strings are assigned to the database table entries. When a database table entry is to be displayed as it belongs to a path of the user selected result, the text string assigned to that database table entry is retrieved and displayed in conjunction with the database table entry. As a consequence, the displayed trace data is understandable even by a non-expert user.

Consistent with a further embodiment of the present invention, a graphical user interface is provided that facilitates a user's navigation along the path of the selected result. This way, a user can go backwards and forwards along the path of the database table entries on which the calculation of the result by the application program is based. This makes the interaction of the individual database table entries transparent and facilitates a user's review and/or modification of the customizing parameters stored in the respective database table entries.

Embodiments of the present invention may provide one or more advantages over conventional approaches. For example, embodiments of the invention may facilitate review and modification of customizing parameters on which execution of an application program is based. It is to be noted that the structure of customizing information stored as customizing parameters in database tables of a relational database can be of a complex nature. Embodiments of the present invention enable making the structure of the customizing information transparent. This is particularly advantageous for non-expert user's as no understanding of the program code of the application program is required for a user's comprehension of the sequence of database table entries on which the calculation of an individual result provided by the application program is based.

Additional objects and advantages of embodiments consistent with the invention will be set forth in part in the description which follows, and in part will be obvious from the description, or may be learned by practice of the disclosed embodiments of the invention. The objects and advantages of embodiments of the invention will be realized and attained by means of the elements and combinations particularly pointed out in the appended claims. Embodiments of the invention are disclosed in the detailed description section and in the appended independent and dependent claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles consistent with the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
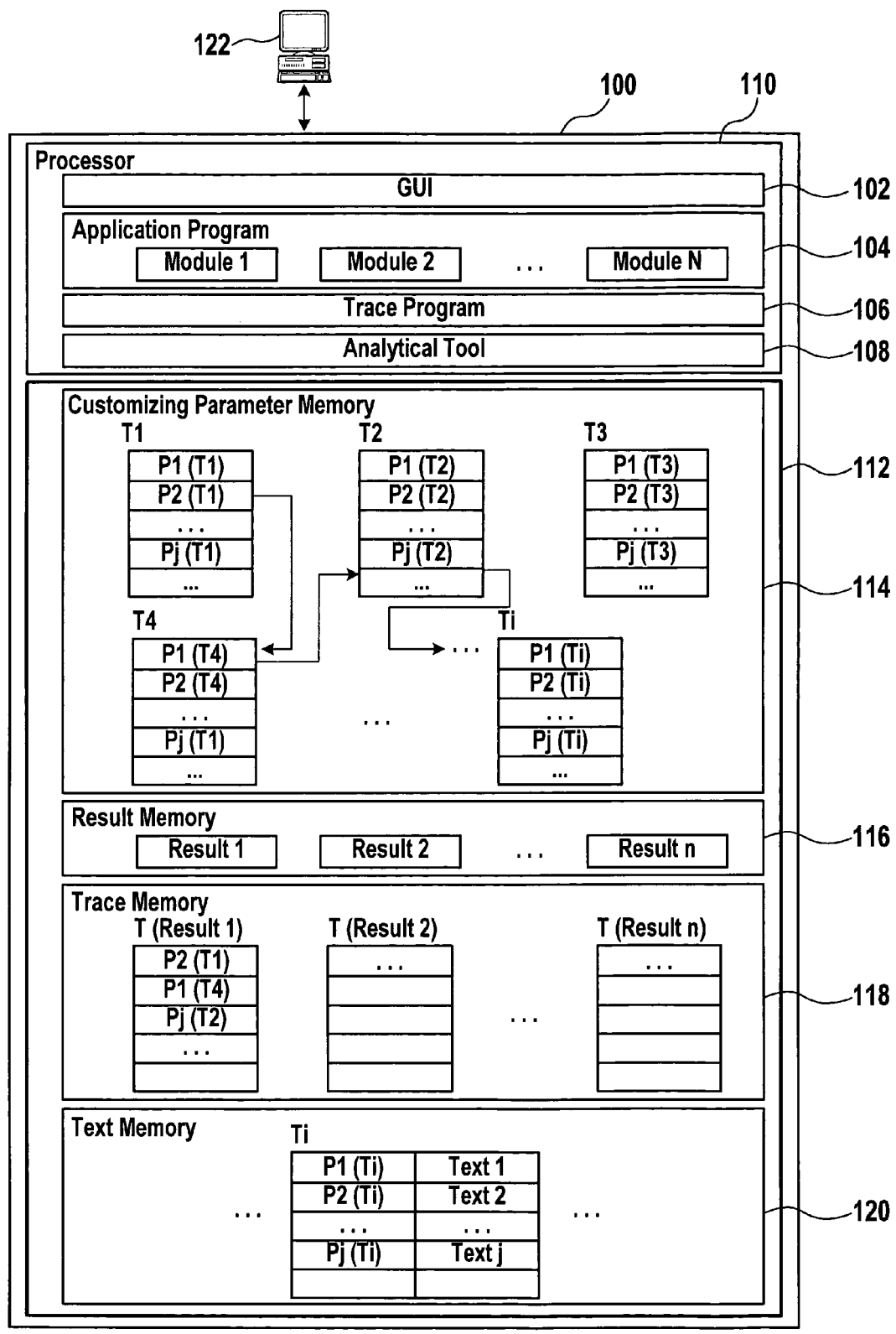
FIG. 1 is a block diagram an exemplary data processing system, consistent with an embodiment of the invention.

FIG. 1 shows an exemplary data processing system 100, consistent with an embodiment of the invention. Data processing system 100 includes a graphical user interface 102, at least one application program 104, trace program 106, and analytical tool 108. Processor 110 serves for execution of these programs. Alternatively, data processing system 100 is a parallel or distributed processing system having a plurality of processors for program execution.

Data processing system 100 further includes memory 112 for storing customizing parameters in memory area 114, for storing results in memory area 116, for storing trace data in memory area 118, and for storing explanatory text strings in memory area 120.

In a preferred example considered here, application program 104 may have a number of N modules or objects that perform various program functionalities. Execution of application program 104 by processor 110 on the basis of the customizing parameters stored in memory area 114 provides a number of n results that are stored in memory area 116.

The customizing parameters may be stored in memory area 114 as a relational database having a number of relational database tables, such as T1, T2, T3, T4, . . . , Ti, . . . .

For example, database table T1 holds customizing parameters P1 (T1) P2 (T1), ... Pj (T1), .... In other words, each one of the database tables Ti may hold a number of parameters {Pj (Ti)}.

The database tables of the relational database stored in memory area 114 may hold complex customizing information. The structure of the customizing information that is used for calculation of the results may be described by a number of paths linking individual ones of the database table entries. By way of example, a portion of one of the paths is illustrated in FIG. 1.

This path starts at entry P2 (T1) of database table T1 from where it goes to table entry P1 (T4) of database table T4. From there the path continues to table entry Pj (T2) of database table T2, etc. By way of example only and without restriction, generality it is assumed that this path illustrated in FIG. 1 holds the customizing information that is used for calculation of result 1 provided by application program 104.

Memory area 120 may hold a number of database tables Ti corresponding to the database tables stored in the memory area 114. In each one of the database tables Ti stored in memory area 120, an explanatory text string may be assigned to each one of the parameters. In other words, text string j may be assigned to customizing parameter Pj (Ti) of database table Ti.

For normal operation of data processing system 100, application program 104 may be started without trace program 106. The results which may thus be obtained are stored in memory area 116 and displayed on monitor 122 by means of graphical user interface 102. If the user is dissatisfied by the displayed results and/or desires to analyze the basis on which the results have been calculated, he or she may start trace program 106.

Next, application program 104 may be executed one more times by processor 110, while trace data may be acquired by trace program 106 and stored in memory area 118. Trace program 106 tracks which ones of the database table entries of the relational database stored in memory area 114 are accessed and in which sequence in order to calculate the n results.

The trace data may consist of a table T for each one of the results. The table T (result 1) may contain a list of the database table entries of the relational database stored in memory area 114 that belong to the path used for calculation of result 1. The same may apply analogously to the further tables T(result 2), ..., T(result n). This way, trace data is acquired and stored in memory area 118 that contains path information being descriptive of the customizing parameters used for calculation of the corresponding results.

After execution of application program 104, the acquired trace data stored in memory area 118 can be analyzed by means of analytical tool 108.

The user can select one of the results provided by execution of application program 104 by means of graphical user interface 102. Analytical tool 108 can retrieve the table T corresponding to the selected result from memory area 118. Analytical tool 108 reads the value of the first element of the sequence, e.g., P2 (T1) from the corresponding database table T1 stored in memory area 114 if result 1 is selected and displays the value by means of graphical user interface 102.

Further, analytical tool 108 can retrieve the explanatory text string belonging to the first element of the path, e.g., P2 (T1) from memory area 120. In other words, text 2 assigned to P2 (T1) in table T1 stored in memory area 120 is displayed in conjunction with the value of that customizing parameter P2 (T1). By means of graphical user interface 102, the user can navigate along the path belonging to the selected result. This will be explained in more detail by making reference to the example shown in FIG. 4.

Figure 2:
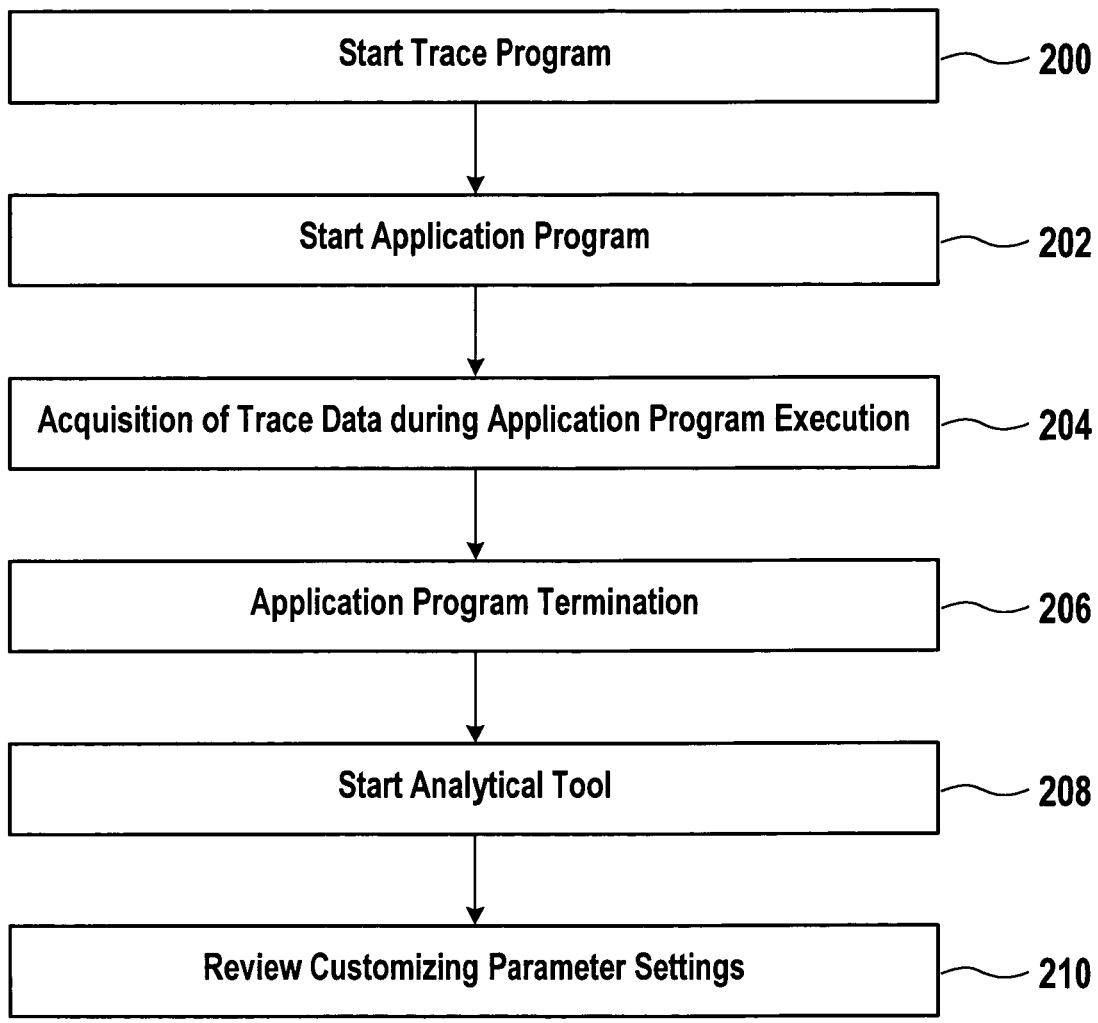
FIG. 2 is a flow chart illustrating an exemplary process for the acquisition of trace data, consistent with an embodiment of the invention.

FIG. 2 shows a flow chart of an exemplary process for the acquisition of trace data. In step 200, the trace program is started. Next, in step 202, the application program can be started. In step 204, trace data may be acquired during execution of the application program.

The acquired trace data may include at least path information regarding the sub-sets of the database table entries stored in the customizing parameter memory area that have been used for calculation of the results. Hence, the acquired trace data acquisition may contain lists, i.e., tables T(result), being descriptive of the database table entries that have been used for calculation of a result.

After termination of the application program (step 206), the analytical tool can be started in step 208. By means of the analytical tool, a user can review and/or modify the customizing parameter settings that have been used as a basis for calculation of the results (step 210). The review and/or modification process of step 210 is explained in greater detail by making reference to the flowchart and exemplary embodiment of FIG. 3.

Figure 3:
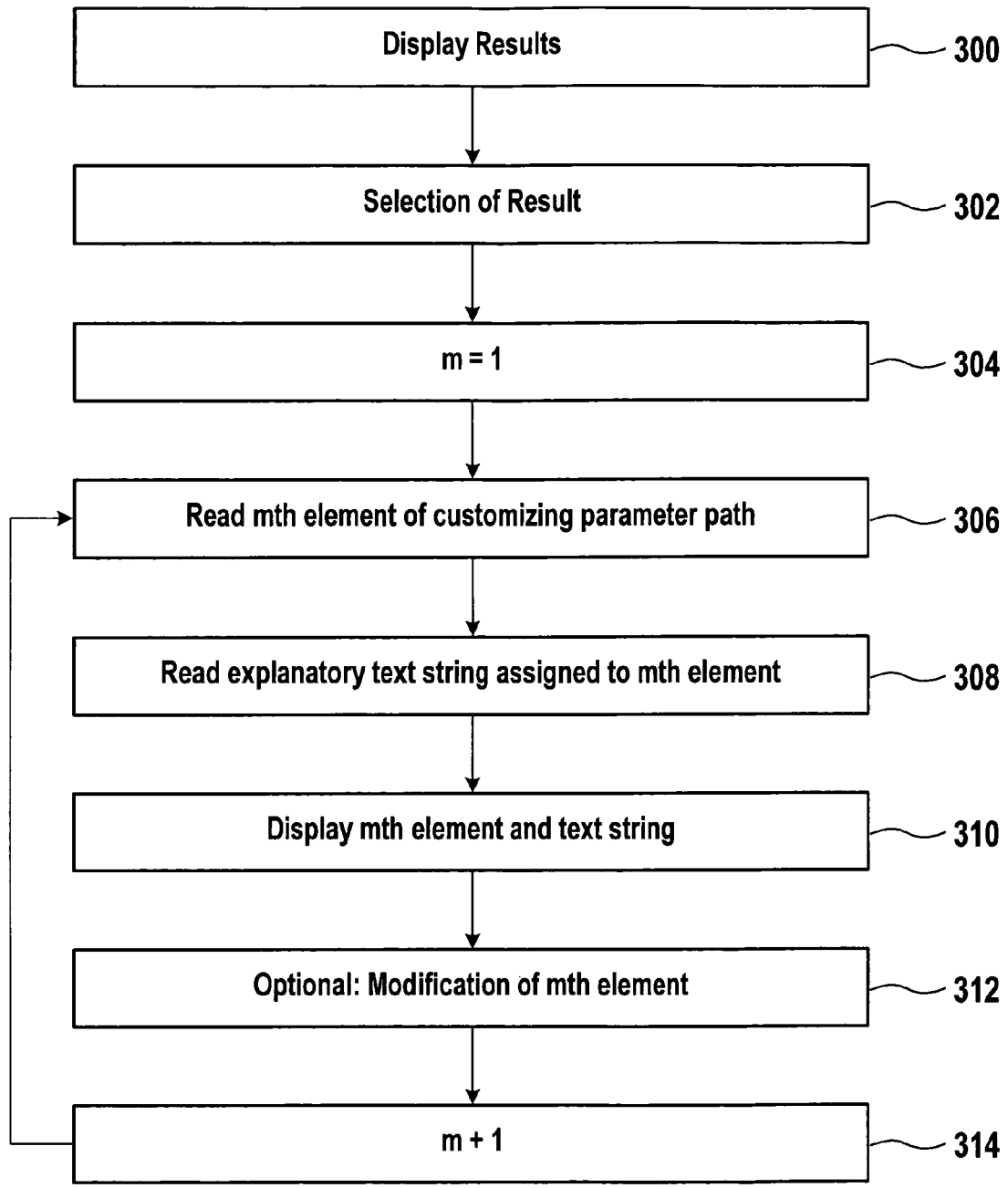
FIG. 3 is a flow chart illustrating an exemplary process for analyzing trace data, consistent with an embodiment of the invention.

In step 300 of FIG. 3, the results provided by the application program are displayed. In step 302, the user selects one of the results for further analysis. In step 304, index m is initialized (e.g., m=1). In step 306, the first element of the customizing parameter path belonging to the selected result can be retrieved and its value is read from the relational database. For example, if result 1 has been selected for analysis, the first element of the trace data table T (result 1) stored in memory area 118 (cf. FIG. 1), i.e., parameter P2 (T1), can be read and its value is retrieved from the relational database stored in memory area 114.

The explanatory text string assigned to the first element of the customizing parameter path can be retrieved from the corresponding table stored in memory area 120 in step 308. In step 310, the first element of the customizing parameter path may be displayed in conjunction with its explanatory text string. In step 312, the user has the option to modify the first element. If the user does not enter a new value for the first element, the first element remains unchanged. Otherwise, the relational database stored in memory area 114 can be updated with the new value of the first element i.e. P2 (T1) in the example considered here.

In step 314, the index m may be incremented and the control goes back to step 306. Steps 306 to 314 can be repeated until the complete customizing parameter path of the trace data of the selected result has been 'scanned' for review and/or modification of the user.

Depending on the implementation, the user may stop the scan along the customizing parameter path at any time in order to jump backwards or forwards along the path or for selection of another result for analysis and/or modification.

Figure 4:
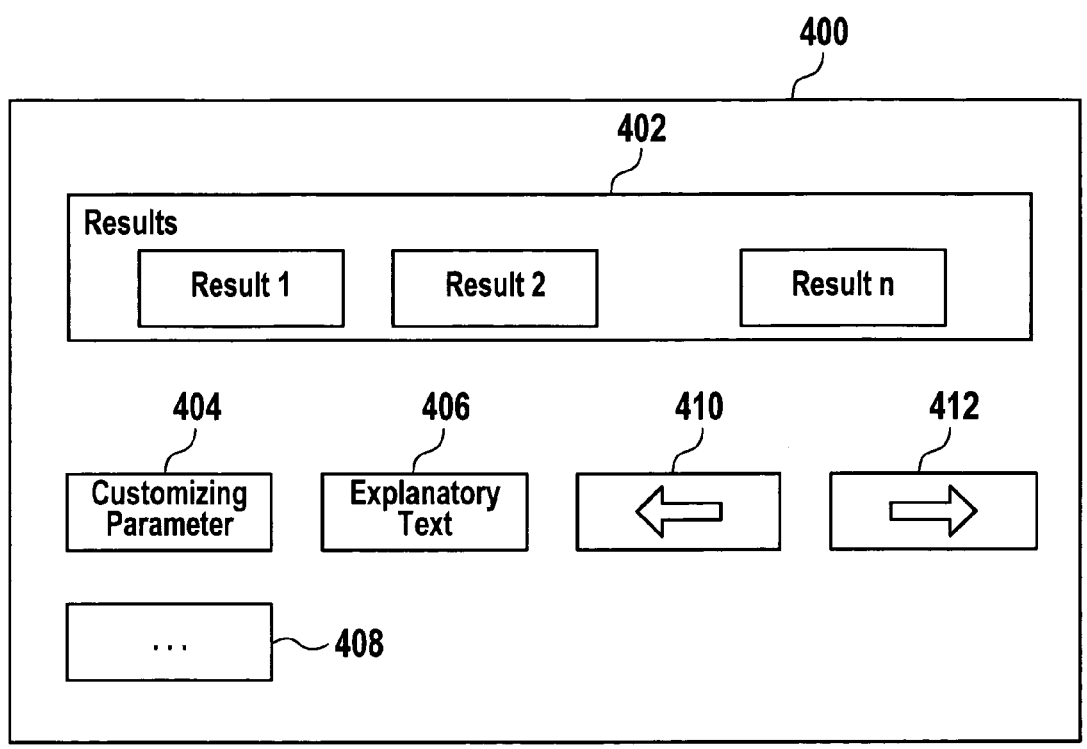
FIG. 4 is a schematic output screen illustrating an exemplary graphical user interface, consistent with an embodiment of the invention.

FIG. 4 shows an exemplary embodiment consistent with the present invention, including an interactive window 400 of analytical tool 108 that may be provided by graphical user interface 102. As illustrated in FIG. 4, window 400 may include a results section 402 for the display of the n results provided by execution of application program 104 (cf. FIG. 1).

Further, window 400 may include an output field 404 for outputting of the value of a customizing parameter and an output field 406 for outputting of the explanatory text being assigned to the customizing parameter displayed in output field 404. Input field 408 serves for a user's input of a new value of the customizing parameter shown in output field 404.

Navigation buttons 410, 412 serve for a user's navigation along a selected customizing parameter path.

In operation, the user starts the analytical tool 108 (cf. FIG. 1) after acquisition of trace data by trace program 106 during execution of application program 104. Analytical tool 108 displays the n results provided by application program 104. The user can select one of the n results by clicking on the display of the corresponding result in result section 402.

In response, the value of the first customizing parameter of the customizing parameter path belonging to the selected result can be displayed in output field 404 and the explanatory text belonging to the first customizing parameter in the customizing parameter path is displayed in output field 406. By clicking on navigation button 412, the user can go to the next customizing parameter along the customizing parameter path belonging to the selected result. Likewise, the user can go backwards along the customizing parameter path by clicking on navigation button 410. Depending on the implementation, additional navigation buttons can be provided in order to facilitate a user's navigation along the selected customizing parameter path.

If a user desires to modify a customizing parameter, he or she can enter a new value for the customizing parameter in input field 408. In response to pressing the enter button, the previous value of the customizing parameter shown in output field 404 is updated by the new value.

Embodiments of the invention can be implemented in digital electronic circuitry, or in computer hardware, firmware, software, or in any combination thereof. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods consistent with the present invention can be performed by one or more programmable processors executing a computer program to perform functions or steps of such methods by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

What is claimed is:

1. A computer-implemented method of displaying customizing parameters of an application program, the customizing parameters being stored in database tables, the method comprising:
   executing the application program;
   storing a set of results provided by the application program, the set of results including a first result;
   acquiring trace data during execution of the application program, the trace data comprising a path for each of the results provided by the application program, each path being descriptive of a sequence of database table entries of the database tables holding a sub-set of the customizing parameters used for a calculation of the corresponding result;
   displaying the results;
   receiving a user selection of the first result;
   initializing, in response to the user selection, an index associated with customizing parameters of the first result;
   retrieving database table entries identified by a path associated with the first result;
   sequentially incrementing the index and displaying customizing parameters based on the retrieved database table entries;
   determining whether the user has modified one of the customizing parameters; and
   updating the database table entries when one of the displayed customized parameters is determined to be modified by the user.

2. The method of claim 1, further comprising:
   retrieving an explanatory text string assigned to a database table entry associated with one of the customized parameters; and
   displaying the text string together with one of the customized parameters.

3. The method of claim 1, further comprising displaying a navigation button for navigation along the path associated with the first result.

4. The method of claim 1, further comprising:
   displaying an input field for modifying the customizing parameters; and
   displaying a navigation button for traversing the path associated with the first result.

5. A computer program product tangibly embodied in a computer-readable storage medium, the storage medium comprising instructions which when executed on a processor, cause the processor to perform a method, the method comprising:

executing an application program;

storing a set of results provided by the application program, the set of results including a first result;

acquiring trace data during execution of the application program, the trace data comprising a path for each of the results provided by the application program, each path being descriptive of a sequence of database table entries of the database tables holding a sub-set of the customizing parameters used for a calculation of the corresponding result;

displaying the results;

receiving a user selection of the first result;

initializing, in response to the user selection, an index associated with customizing parameters of the first result;

retrieving database table entries identified by a path associated with the first result;

sequentially incrementing the index and displaying customizing parameters based on the retrieved database table entries;

determining whether the user has modified one of the customizing parameters; and updating the database table entries when one of the displayed customized parameters is determined to be modified by the user.

6. The computer program product of claim 5, further comprising program instructions for retrieving an explanatory text string assigned to a database table entry associated with one of the customized parameters.

7. The computer program product of claim 5, further comprising graphical user interface instructions to enable the user's navigation along the path.

8. The computer program product of claim 5, further comprising instructions for:

displaying an input field for modifying the customizing parameters; and displaying a navigation button for traversing the path associated with the first result.

9. A data processing system comprising:

a data processor for executing an application program;

a memory device for storing a set of results provided by the application program, the set of results including a first result, wherein trace data is acquired during execution of the application program, the trace data comprising a path for each of the results provided by the application program, each path being descriptive of a sequence of database table entries of the database tables holding a sub-set of the customizing parameters used for a calculation of the corresponding result;

a display device for displaying the results; and an input device for receiving a user selection of the first result, wherein the data processor is configured to:

initialize, in response to the user selection, an index associated with customizing parameters of the first result;

retrieve database table entries identified by a path associated with the first result;

sequentially increment the index to display customizing parameters based on the retrieved database table entries;

determine whether the user has modified one of the customizing parameters; and update the database table entries when one of the displayed customized parameters is determined to be modified by the user.

10. The data processing system of claim 9, wherein the processor is configured to retrieve an explanatory text string assigned to a database table entry associated with one of the customized parameters, and the display devices displays the text string together with one of the customized parameters.

11. The data processing system of claim 9, wherein the display device displays a navigation button for navigation along the path associated with the first result.

12. The data processing system of claim 9, wherein the display device displays an input field for modifying the customizing parameters.

* * * * *